(12) United States Patent
Madhavapeddi

(10) Patent No.: US 9,454,324 B1
(45) Date of Patent: Sep. 27, 2016

(54) METHODS AND APPARATUS FOR DATA LIFECYCLE ANALYSIS

(71) Applicant: EMC Corporation, Hopkinton, MA (US)

(72) Inventor: Vijay Madhavapeddi, Cupertino, CA (US)

(73) Assignee: EMC Corporation, Hopkinton, MA (US)

( * ) Notice: Subject to any disclaimer, the term of this patent is extended or adjusted under 35 U.S.C. 154(b) by 131 days.

(21) Appl. No.: 14/133,371

(22) Filed: Dec. 18, 2013

(51) Int. Cl.
*G06F 3/06* (2006.01)

(52) U.S. Cl.
CPC ........... *G06F 3/0649* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 2008/0133624 A1* | 6/2008 | Phillips et al. | 707/204 |
| 2008/0285580 A1* | 11/2008 | Yotsumoto | 370/412 |
| 2011/0185130 A1* | 7/2011 | Hara | G06F 3/0605 711/154 |
| 2012/0123999 A1* | 5/2012 | Ashutosh et al. | 707/618 |
| 2014/0122471 A1* | 5/2014 | Houston et al. | 707/731 |
| 2014/0258358 A1* | 9/2014 | Lin et al. | 709/201 |

* cited by examiner

*Primary Examiner* — Midys Rojas
*Assistant Examiner* — Charles Choi
(74) *Attorney, Agent, or Firm* — Blakely, Sokoloff, Taylor & Zafman LLP

(57) ABSTRACT

Methods and apparatuses to determine similarity among data lifecycles of data sets protected via a backup store having one or more storage devices are described. Each data set may be associated with one data lifecycle indicating a schedule to store one or more copies of the data set in the storage devices. The backup store can have one or more polices. Each life cycle may be specified in one of the policies. Two or more of the policies may be consolidated into one single policy specifying an updated data lifecycle. In one embodiment, the updated data lifecycle and data lifecycles of the two or more polices may be similar according to the similarity determined. A particular one of the data set may be associated with one of the data lifecycles of the two or more polices. The storage device may be configured to back up the particular data set according to the updated data lifecycle of the one single policy.

21 Claims, 10 Drawing Sheets

300

Determining similarity among data lifecycles of data sets protected via a backup store having one or more storage devices, wherein each data set is associated with one data lifecycle indicating a schedule to store one or more copies of the data set in the storage devices, wherein the backup store has one or more polices, each life cycle is specified in one of the policies 301

↓

Consolidating at least two or more of the policies into one single policy, wherein the one single policy specifies an updated data lifecycle, wherein the updated data lifecycle and data lifecycles of the two or more polices are similar according to the similarity determined, wherein a particular one of the data sets is associated with one of the data lifecycles of the two or more polices 303

↓

Configuring the storage devices to back up the particular data set according to the updated data lifecycle of the one single policy 305

300

Determining similarity among data lifecycles of data sets protected via a backup store having one or more storage devices, wherein each data set is associated with one data lifecycle indicating a schedule to store one or more copies of the data set in the storage devices, wherein the backup store has one or more polices, each life cycle is specified in one of the policies 301

Consolidating at least two or more of the policies into one single policy, wherein the one single policy specifies an updated data lifecycle, wherein the updated data lifecycle and data lifecycles of the two or more polices are similar according to the similarity determined, wherein a particular one of the data sets is associated with one of the data lifecycles of the two or more polices 303

Configuring the storage devices to back up the particular data set according to the updated data lifecycle of the one single policy 305

Determining similarity among data lifecycles of data sets protected via a backup store having one or more storage devices, wherein each data set is associated with one data lifecycle, each data lifecycle associated with a policy specifying a schedule for a sequence of backup operations to store one or more copies of the associated data set in the storage devices, the data lifecycle corresponding to the sequence of backup operations 401

Identifying one or more groups of the data lifecycles, wherein data lifecycles within each group are similar to each other according to the similarity determined, wherein a particular one of the data lifecycles within a particular one of the group is associated with a particular policy 403

Configuring the storage devices to back up data sets of data lifecycles of the particular group according to the particular policy 405

Fig. 4

METHODS AND APPARATUS FOR DATA LIFECYCLE ANALYSIS

FIELD OF THE INVENTION

Embodiments of the present invention relate generally to data storage systems. More particularly, embodiments of the invention relate to analyzing data lifecycles for storage systems.

BACKGROUND

A storage system providing data protection usually stores client data according to configurations customized, such as via a policy, with client requirements. For example, the client data may be backed up and cloned in a daily, weekly, monthly basis as configured into selected storage units with various data access capabilities.

As the size of client data and/or the number of clients increase, variations of client requirements can complicate the management of the storage system significantly. For example, polices in the configurations may be updated or added in an on going basis to accommodate requests or changes from new or existing clients. Tracking differences and/or relationships among a constantly growing number of policies supported in the configurations may become tedious and time consuming, if not impossible.

Thus, existing mechanisms for configuring a storage system are not efficient, not user friendly and ineffective.

BRIEF DESCRIPTION OF THE DRAWINGS

Embodiments of the invention are illustrated by way of example and not limitation in the figures of the accompanying drawings in which like references indicate similar elements.

FIG. 3 is a flow diagram illustrating one embodiment of a process to analyze data lifecycles for consolidating data backup polices according to one embodiment of the invention;

FIG. 4 is a flow diagram illustrating one embodiment of a process to analyze data lifecycles for identifying data backup polices according to one embodiment of the invention;

DETAILED DESCRIPTION

Figure 1:
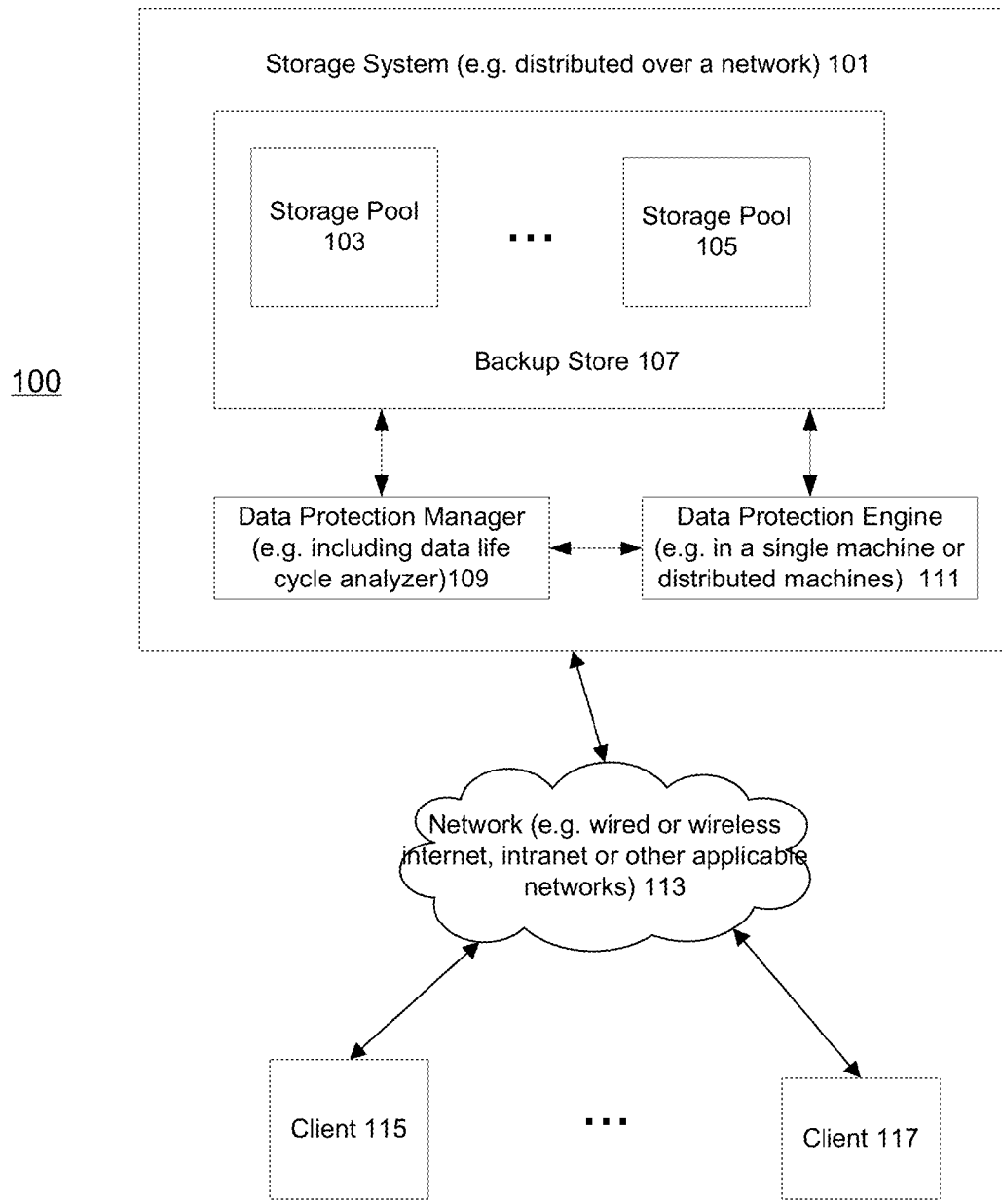
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In one embodiment, data lifecycle analysis can identify similarities among multiple options to organize and/or adjust data protection policies for storage systems. The number of different data lifecycles can be reduced to improve manageability. Configuration updates of storage systems to match data protection requirements for efficient resource usage can be simplified with a reduced number of data lifecycles.

In some embodiments, visualization of data lifecycles can be provided for data flow analysis to enable users (e.g. storage service administrators) to create and/or consolidated data protection policies. Similarities/differences of data protection policies among multiple clients (e.g. users of storage systems for data protection) can be exposed, e.g. graphically, via the visualization. High level patterns with clusters (or organization) of data lifecycles can be identified to determine which data protection policy (or data lifecycle) matches data protection requirements (e.g. selection options) of a client.

In one embodiment, graphical representations of data lifecycles can be based on information related to configuration data and record database associated with a storage system. Administrative queries on status or data lifecycles of the storage system can be answered in a visual manner via these graphical representations of data lifecycles. Customer support service or backup service client configuration service may provide service information to clients based on visual answers provided by the graphical representations of data lifecycles.

Examples of administrative queries may include, but are not limited to, current stored locations for backups and clones of a client's data, attributes of a data lifecycle (e.g. retention period), the number of different kinds of data lifecycles a backup policy encapsulates (or includes), statistics information (e.g. percentage) of different data lifecycles in a save set (e.g. a set of machines belonging to one client of a storage service), number of policies (e.g. one or a group of data lifecycles) supporting data lifecycles similar to data lifecycles associated with a particular client, etc.

In one embodiment, backup storage devices may be partitioned into multiple pools. A data lifecycle for a data unit (e.g. data to be backed up from one machine) may include a data path representing a storage sequence (e.g. time order) of the data unit along one or multiple pools in the backup storage devices. Graphical representations of each pool via data lifecycle analysis may include "reads/writes vs. time" graphs with min, average, and max access time. A save set may be associated with multiple data lifecycles. Each data lifecycle may be represented by a graph via data lifecycle analysis. In some embodiments, visual presentations of data lifecycle analysis may include listings of multiple (e.g. all) save sets subscribing to the backup service with multiple data paths along the pools.

FIG. 1 is a block diagram illustrating a storage system according to one embodiment of the invention. Referring to FIG. 1, system 100 includes, but is not limited to, one or more client systems 115, 117 communicatively coupled to storage system 101 over network 113. Clients 115, 117 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of clients 115, 117 may be a primary storage system that provides storage to other local clients, which may periodically back up the content stored therein to a backup storage system, such as storage system 101. Network 113 may be any type of network such as a local area network (LAN), a wide area network (WAN) such as the Internet, a fiber network, a storage network, or a combination thereof, wired or wireless. Clients 115, 117 may be in physical proximity or may be physically remote from one another. Storage system 101 may be located in proximity to one, both, or neither of clients 115, 117.

Storage system 101 may include any type of server or cluster of servers. For example, storage system 101 may be a storage server used for any of various different purposes, such as to provide multiple users with access to shared data and/or to back up data (e.g., mission critical data). In one embodiment, storage system 101 includes, but is not limited to, data protection manager 109, data protection engine 111, and backup store 107.

In one embodiment, backup store 107 may include storage units communicatively coupled to each other. Storage units in backup store 107 may be partitioned into one or more storage pools 103, 105. Each storage unit may be implemented locally (e.g., single node operating environment) or remotely (e.g., multi-node operating environment) to include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

Data protection manager 109 can configure backup store 107 and/or data protection engine 111. For example, a system administrator can implement or update various backup policies for different client requirements/requests via data protection manger 109. In some embodiments, data protection manager 109 may include a data life cycle analyzer to provide guidance (e.g. visual information for storage pool selections) to manage a storage system configuration. Client data may be copied/cloned to selected storage pools in backup store 107 according to data protection engine 111 as configured.

In some embodiments, data protection engine 111 may segment a data file (e.g. a unit of data to be copied) into multiple chunks (also referred to as segments) according to a variety of segmentation policies or rules. Data protection engine 111 may choose not to store a chunk in a storage unit if the chunk has been previously stored in the storage unit. In the event that Data protection engine 111 chooses not to store the chunk in the storage unit, it stores metadata enabling the reconstruction of the file using the previously stored chunk. As a result, chunks of data files are stored in a deduplicated manner, either within each storage unit or across multiple storage units. Metadata of each storage unit includes enough information to provide access to the files it contains.

Figure 2:
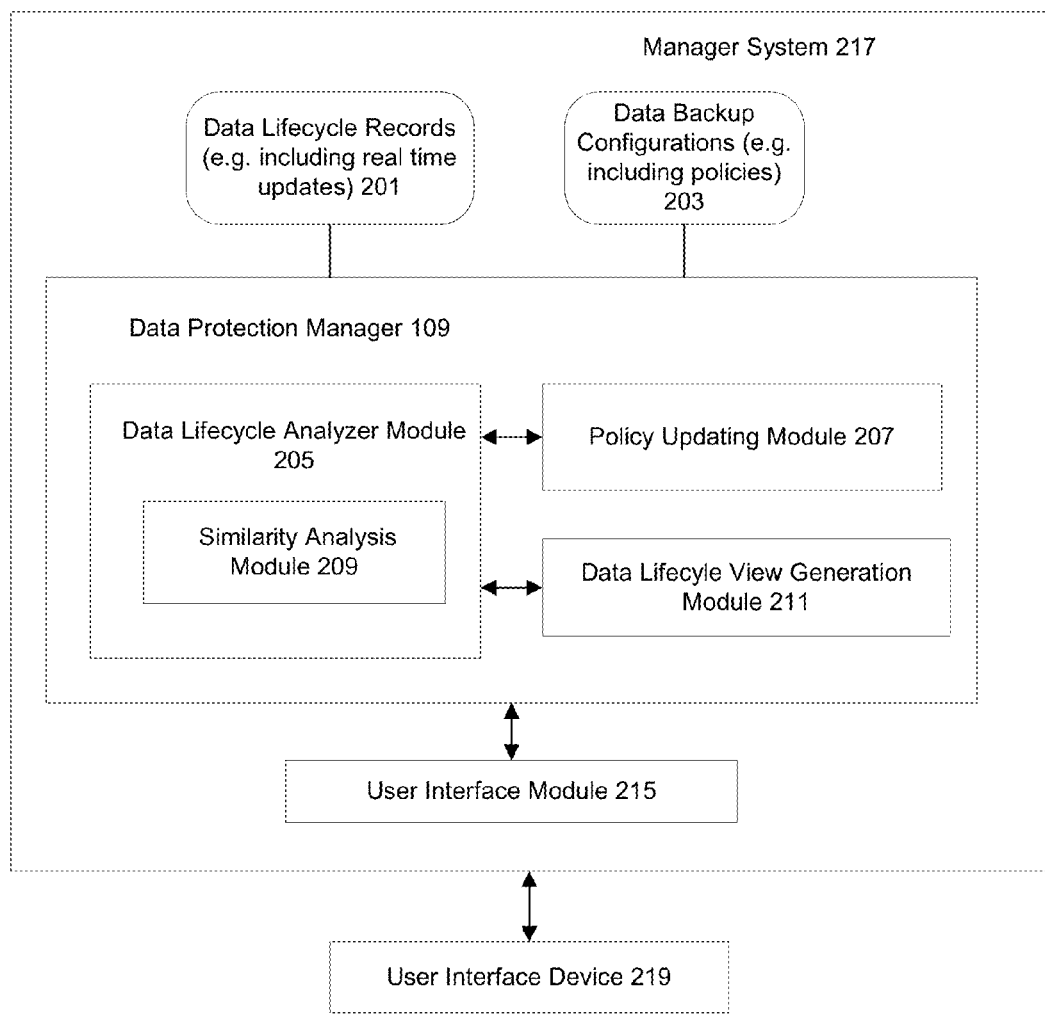
FIG. 2 is a block diagram illustrating system components for managing data lifecycles according to one embodiment of the invention.

FIG. 2 is a block diagram illustrating system components for managing data lifecycles according to one embodiment of the invention. For example, system 200 may be hosted in storage system 101 of FIG. 1. Manager system 217, such as an operating system running in a machine, may include data protection manager 109 coupled with a user interface module 215 to present/receive configuration related information/instructions with, for example, a system administrator via user interface device 219, such as a display device, or other application input/output device.

In one embodiment, manager system 217 may include data life cycle records 201 and data backup configurations 203. Data life cycle records 201 can include a data base or other applicable structure data storing a history of data paths and retention information, or data lifecycles, for a client data set (or saveset). For example, client data may include a data set with data elements (e.g. data files, or other applicable data units) from one or more client machines, such as client 115, 117 of FIG. 1. A data path may include a sequence of destination storage pools for backup events (e.g. copying or cloning). A retention period may indicate how long (e.g. a time period) backup data stays in the destination pool after being backed up to the destination pool. Data lifecycle records may be updated in real time on occurrences of, for example, backup events or expirations of retention periods.

Data backup configurations 203 may include settings specified or automatically determined according to, for example, client requirements and/or system management polices. For example, backup configurations 203 may include information on which storage pools and/or schedule to copy/clone data to/among the associated storage pools for a client. Settings in backup configurations 203 for a client may be determined (automatically or manually) based on efficiency consideration in utilizing processing resources of the back up service. For example, storage pools may be partitioned according to access time, capacity, security levels and/or other applicable processing characteristics of storage units. Backup configurations 203 may include multiple policies separately assigning different collections of storage pools and/or schedules for data backup. A client may be designated (automatically or manually) to one or more of these polices in the backup configurations 203. Backup configuration 203 may include exceptions associated with the policies for a client to provide variations of backup policies.

According to one embodiment, data protection manager 109 can include data lifecycle analyzer module 205 to provide various views, answer queries and/or identify hidden characteristics of existing data lifecycles in the backup services. For example, clusters of similar data lifecycles can be exposed to help simplify organizations of backup polices automatically and/or interactively via visual presentations for similarity comparisons among different data lifecycles. Data lifecycle analyzer module 205 may include similarity analysis module 209 to perform similarity analysis, clustering analysis, and or other applicable analysis on the population of existing (e.g. including historical) data lifecycles. Each data lifecycle may be represented via a collection of attribute values. In some embodiments, a set of attributes representing a data lifecycle may be selected or specified by a user.

Data protection manager 109 may include policy updating module 207 and data lifecycle view generation module 211. Policy updating module 207 can update backup polices, for example, via data backup configurations 203, based on analysis results of data lifecycle analysis module 205. Existing policies and/or associated exceptions may be consolidated and/or simplified in updated backup policies to improve processing and/or management efficiencies. View generation module 211 may present results of data lifecycles analysis via visual presentation, for example, via user interface module 215, to facilitate decision making to design/implement backup policies.

FIG. 3 is a flow diagram illustrating one embodiment of a process to analyze data lifecycles for consolidating data backup polices according to one embodiment of the invention. Exemplary process 300 may be performed by a processing logic that may include hardware (circuitry, dedicated logic, etc.), software (such as is run on a dedicated machine), or a combination of both. For example, process 300 may be performed by some components of system 200 of FIG. 2. At block 301, for example, the processing logic of process 300 determines similarity among data lifecycles of data sets protected via a backup service or store, such as backup store 107 of FIG. 1, having storage devices to store backed up data.

In one embodiment, each data set in a backup store may be associated with one data lifecycle indicating a schedule to store one or more copies of the data set in storage devices of the backup store. Each data lifecycle may be associated with one (or more) of the backup polices associated with the backup store. A backup policy may specify when and which storage pools to back up the associated data set. A history of data lifecycles may be stored in a database or record for future analysis. In one embodiment, a history of data lifecycles can include a selected recent portion of data lifecycles and the current (e.g. real time updated) data lifecycles.

At block 303, the processing logic of process 300 can consolidate or combining multiple existing polices into one single policy based on similarities determined among the existing polices. For example, the single policy consolidated may specify an updated data lifecycle which is similar to data lifecycles of the consolidated polices according to the similarity determined. In some embodiments, exceptions associated with existing polices may be consolidated into the single policy. The total number of consolidated polices in a backup store may be smaller than the total number of existing policies in the back up store prior to the consolidations.

Subsequent to the consolidation of polices, the processing logic of process 300 may configure the storage devices to back up data set associated with the existing polices via the single consolidated policy at block 305. The storage devices may be partitioned into one or more pools or groups. A data lifecycle of a data set may specify backup operations performed according to a schedule associated with a policy of the data set to copy or clone the data set to a destination one of the pools. In one embodiment, two data lifecycles which are determined to be similar may specify at least one common destination pool.

In one embodiment, backup operations may be characterized by attributes having values. A data life cycle may be represented based on selected or configured attributes of the backup operations specified in the data life cycle. A distance between two collections of attribute values of two separate data lifecycles may be identified or determined to measure similarity between different data lifecycles. The distance may include Euclidean measure or other application distance measurement for multi dimension values. Two separate data lifecycles may be similar if the distance identified in between is within (e.g. less than) a threshold value, which may be statically or dynamically configured.

In some embodiment, attributes of a data lifecycle may include a retention duration for each destination pool identified in each backup operation specified in the data lifecycle. The retention period may represent a length of time period during which a data set of the data lifecycle is retained in a destination pool after the data set was copied or cloned to the destination pool. The similarity of two data lifecycles may depend on whether two retention durations for a commonly identified destination pool specified in the two data lifecycles differ within a threshold time margin (e.g. 60 seconds or other applicable time duration), which may be statically or dynamically configured.

In one embodiment, the processing logic of process 300 can present a graphical view of a data lifecycle via a user interface, such as user interface device 219 of FIG. 2. The graphical view can indicate backup operations performed according to a backup schedule associated with the data lifecycle. In some embodiments, the graphical view may be updated in real time to indicate which storage pools the data set associated with the data lifecycle are currently stored. Multiple copies of the data set may be stored separately in multiple storage pools at a time. The graphical view may indicate when the data set was copied or cloned to a storage pool. Alternatively or additionally, the graphical view may show the time period during which the data set was stored or retained in a storage pool.

In some embodiments, attributes associated with a data lifecycle may include identifiers associated with storage pools storing copies of the data set associated with the data lifecycle. For example, the attributes can include a destination identifier for a destination pool of a backup operation specified for the data lifecycle. In one embodiment, at least one of the backup operations of the data lifecycle copies the data set from a source pool (or storage pool) to a destination pool to clone the data set. The attributes of the data lifecycles may include a representation of the backup operations including a pair of ordered identifiers identifying the source pool and the destination pool.

According to certain embodiments, the distance in similarity between two data lifecycles may be measured based on a comparison between two corresponding collections of attribute values. For example, if a backup operation represented by an ordered pool pair (e.g. a pair of storage pool identifiers) is included in a first collection of attribute values representing a first data lifecycle but not in a second collection of attribute values representing a second data lifecycle, these two data lifecycles may be identified as not similar. In other words, the distance in similarity between these two data lifecycles may be assigned a value exceeding a threshold value which is configured to indicate similarity.

In one embodiment, attributes in a data lifecycle can include a schedule for each backup operation. Whether two data lifecycles are similar may depend on whether corresponding schedules can be substantially aligned in time (e.g. within a temporal margin). For example, the attributes of a data lifecycle may have a temporal sequence associated with scheduled times of backup operations. A temporal sequence may specify an ordered list of time durations, each duration for scheduling adjacent back up operations. If two temporal sequences are alignable, both may include a common number of time durations and each corresponding time duration (based on the sequence order) differ within a configured margin or threshold time granularity (e.g. 10 minutes). Additionally, if two temporal sequences are alignable, both may be associated with backup operations with a common collection of destination storage pools. Two data lifecycles separately having two temporal sequences may be identified as being not similar to each other if these two temporal sequences are not alignable.

In some embodiments, the processing logic of process 300 can provide consolidated policies from records of data lifecycles for a backup store. The consolidated polices may represent an initial collection of policies or initial polices. In response to a subsequent client request for protecting a client data set, the processing logic of process may generate (e.g. automatically or interactively) an additional policy for the client data set according to one policy which best matches requirements of the client request in the initial polices. The additional policy may be based on an update of the policy which best matches the client request. The additional policy may include the policy with a modification or exception as updated to satisfy the client request. The processing logic of process 300 can add the additional policy to the backup store for further client requests.

For example, a client request may include a level of required access time for storage pools and a backup schedule. An existing policy may specify a backup operation to a destination pool with the requested backup a schedule. The destination pool may be associated with an access time which does not match the client requested access time (e.g. slower or faster). A new policy may be created based on the existing policy and a modification indicating replacement of the backup operation with an alternative backup operation to an alternative destination pool with comparable or matching access time to the client requested access time.

FIG. 4 is a flow diagram illustrating one embodiment of a process to analyze data lifecycles for identifying data backup polices according to one embodiment of the invention. Exemplary process 400 may be performed by a processing logic that may include hardware software or a combination of both. For example, process 400 may be performed by some components of system 200 of FIG. 2. At block 401, the processing logic of process 400 can determine similarity among data lifecycles of data sets protected via a backup store having one or more storage devices, such as backup store 107 of FIG. 1. Each data set is associated with one data lifecycle. Each data lifecycle may be associated with a policy specifying a schedule for a sequence of backup operations to store at least one copy of the associated data set in the storage devices. A history of data lifecycles may be recorded, for example in a database. Each data lifecycle may correspond to a sequence of backup operations associated with a policy specifying when (e.g. schedule) and/or where (e.g. which target pool) to perform the backup operations.

At block 403, the processing logic of process 400 can identify or discover one or more groups or clusters of recorded data lifecycles. Data lifecycles within each group may be similar to each other according to the similarity determined. A particular one of the data lifecycles within a particular one of the group may be associated with a particular policy. At block 405, the processing logic of process 400 can configure the storage devices to back up data sets of data lifecycles of the particular group according to the particular policy. As a result, original polices associated with the data lifecycles of the particular group can be consolidated into one single policy to simplify management of the backup store.

Figure 5:
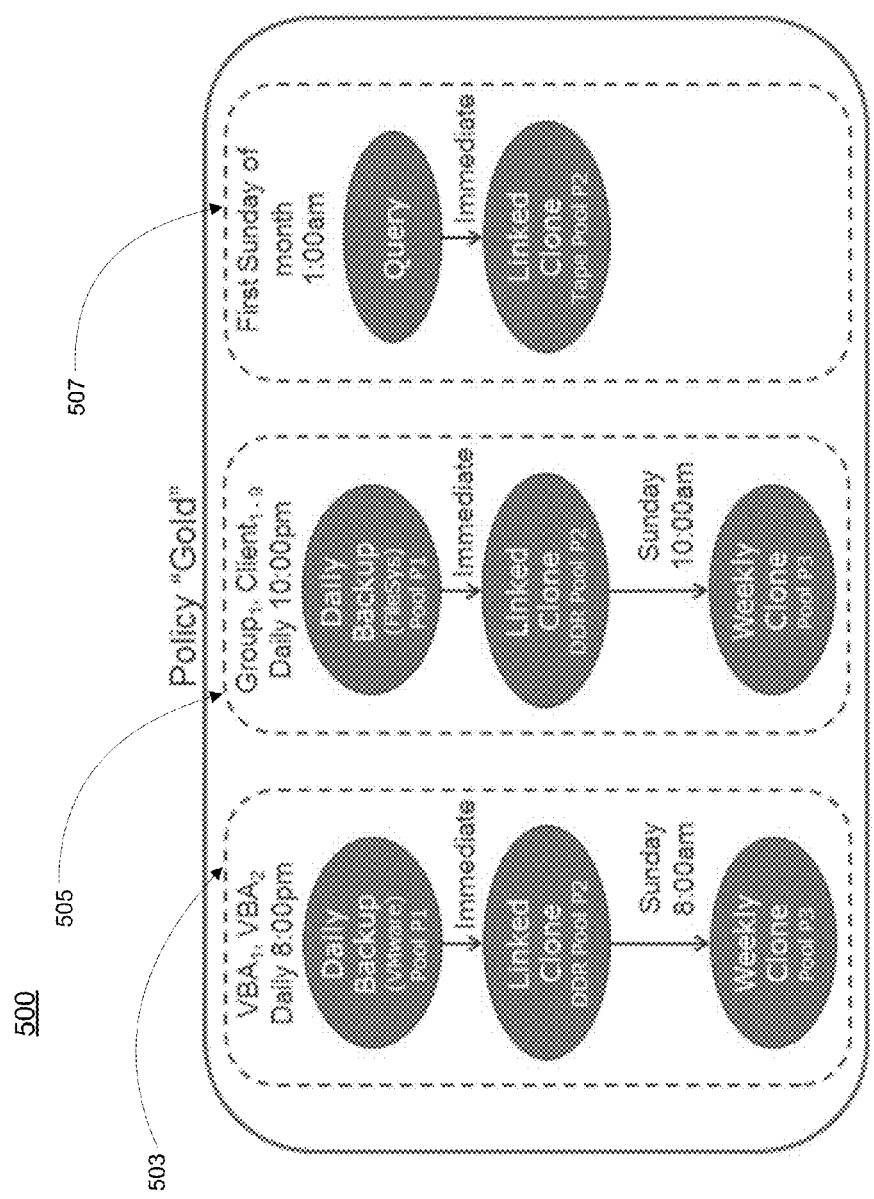
FIG. 5 is a sample diagram illustrating an example of a policy for data protection according to one embodiment of the invention.

FIG. 5 is a sample diagram illustrating an example of a policy for data protection according to one embodiment of the invention. For example, policy 500 may specify a schedule for backup operations for data lifecycles in backup store 107 of FIG. 1. Data sets designated for policy 500 may include client data set in schedule 503, administrative data set in schedule 505, or dynamically query generated data set in schedule 507. Policy 500 may specify protocols such as file system based in schedule 503, virtualization system based in schedule 505, or other applicable backup protocols for scheduled backups. Each backup operation may identify a target storage pool, such as P1, P2, and P3 of schedule 1.

Figure 6:
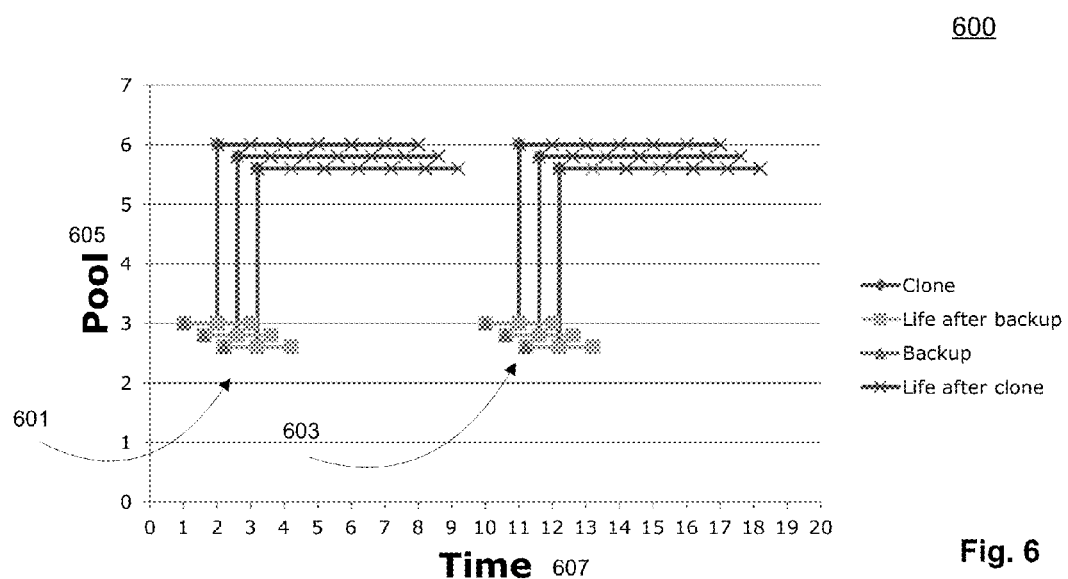
FIGS. 6-7 are sample diagrams illustrating visual representations of similarity in data lifecycles according to one embodiment of the invention.
Figure 7:
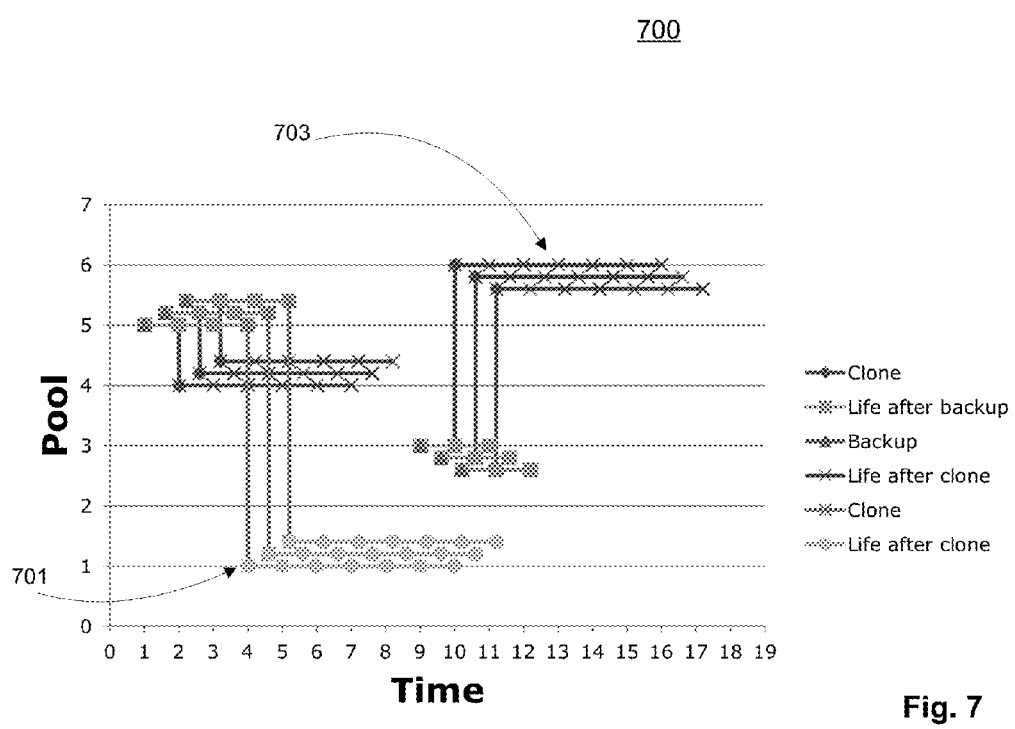
Figure 8A:
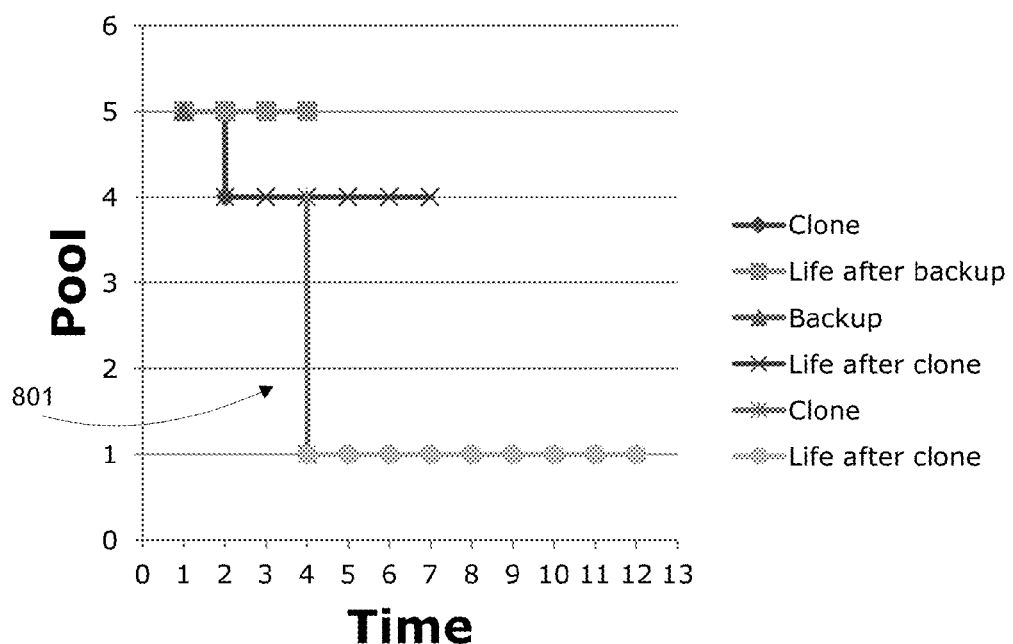
FIGS. 8A-8F are sample diagrams illustrating exemplary visual representations of data lifecycles according to one embodiment of the invention.
Figure 8B:
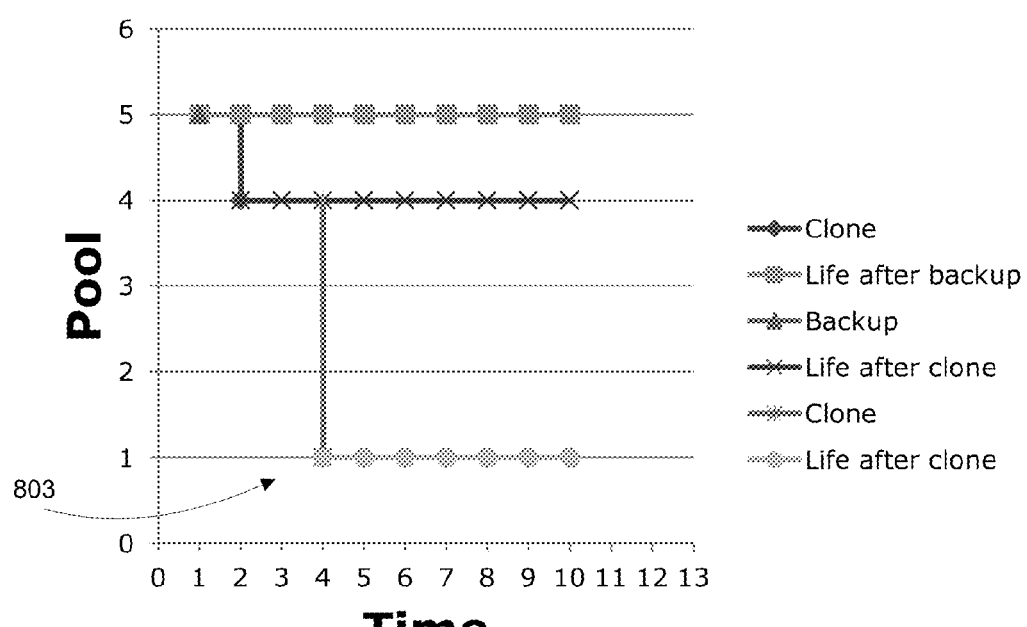
Figure 8C:
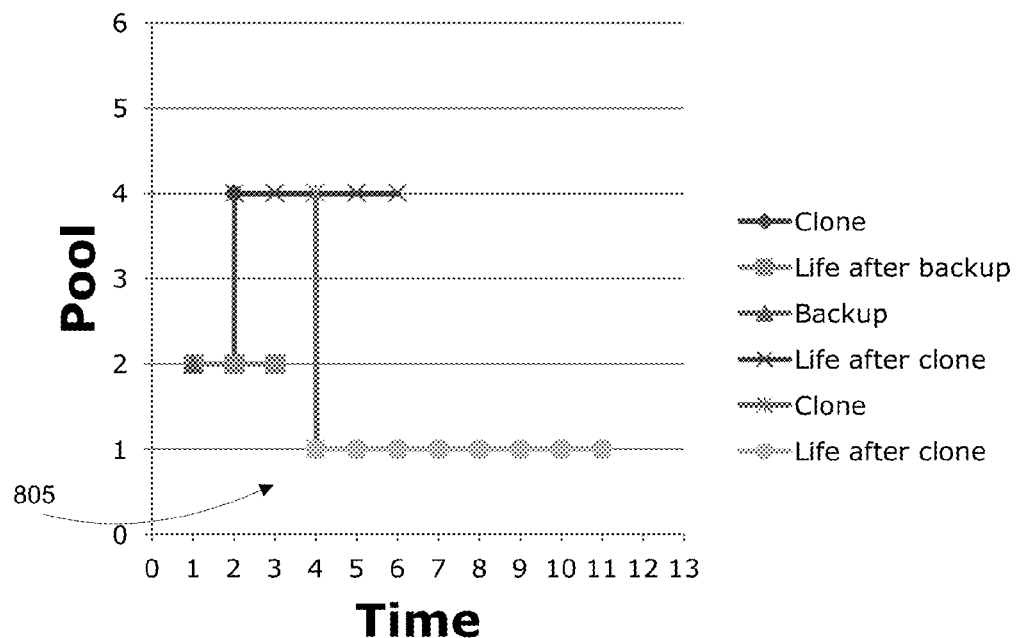
Figure 8D:
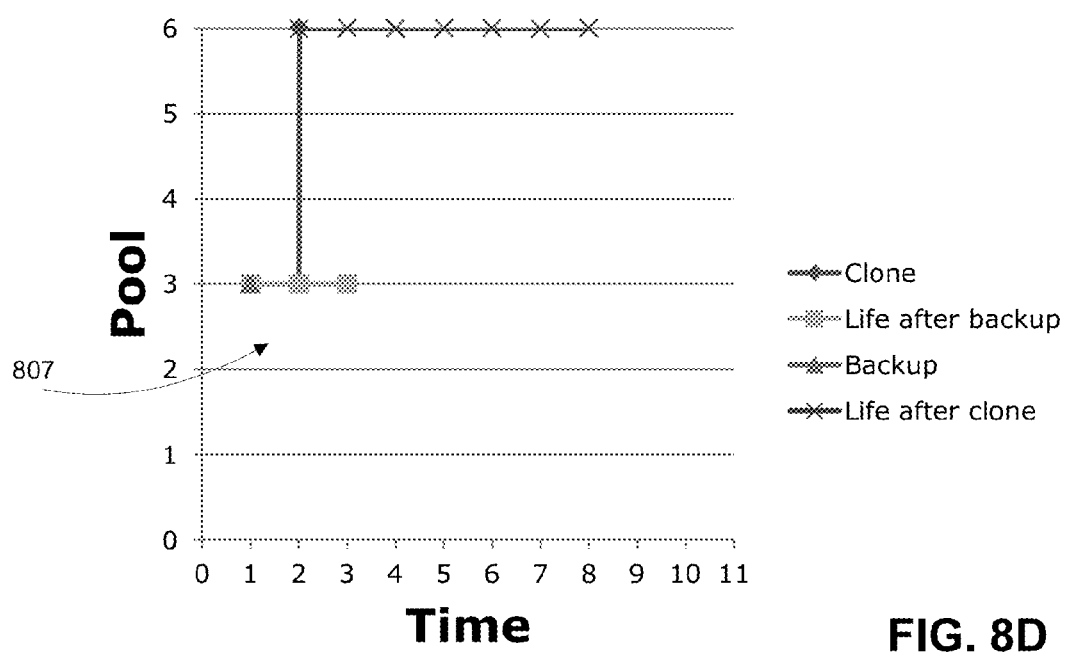
Figure 8E:
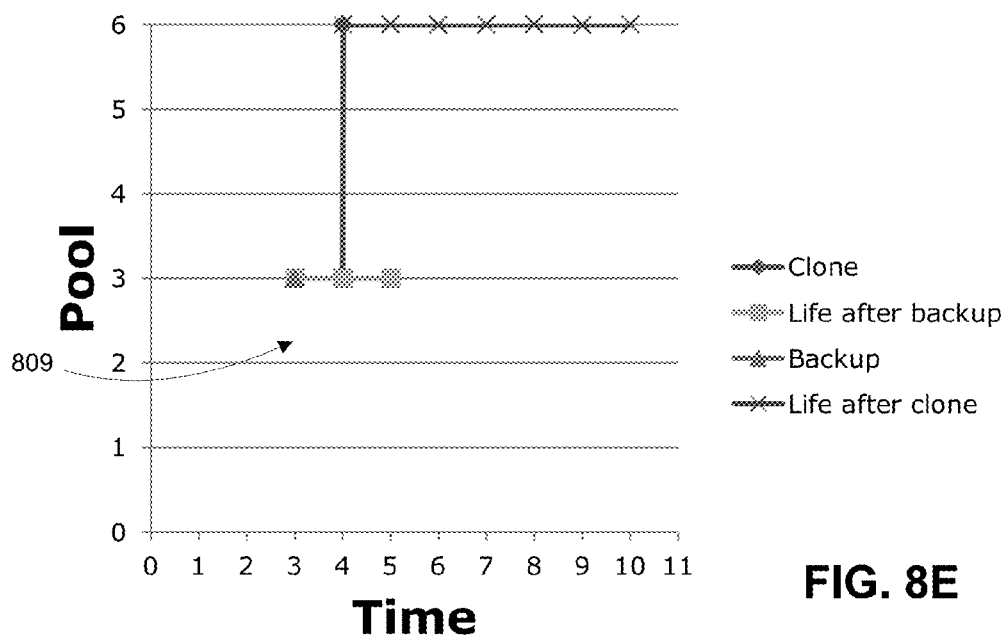
Figure 8F:
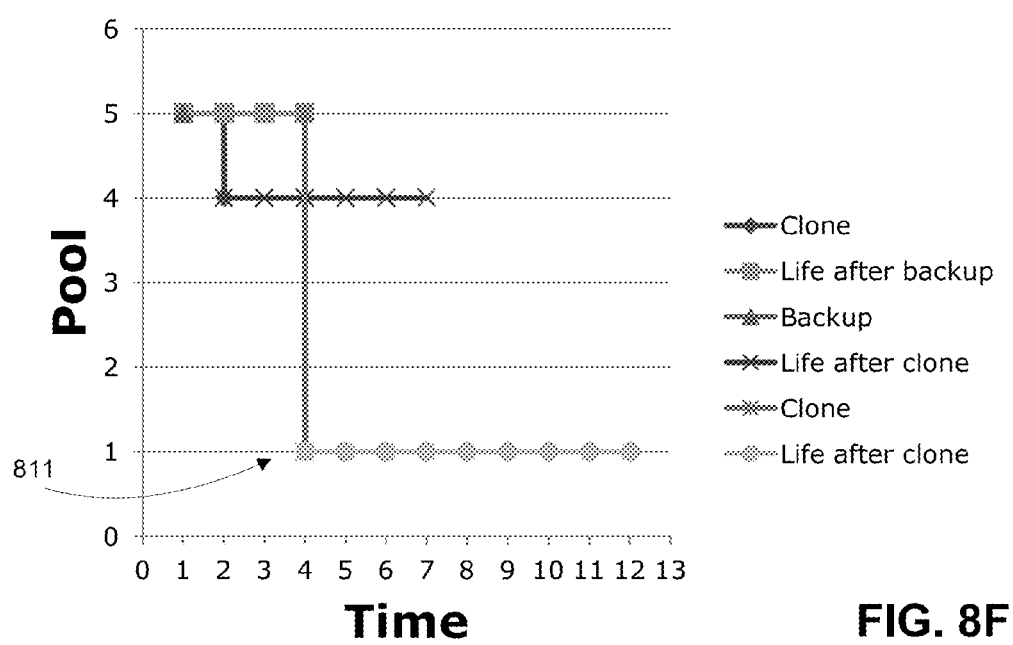

FIGS. 6-7 are sample diagrams illustrating visual representations of similarity in data lifecycles according to one embodiment of the invention. Diagrams 600-700 may illustrate visual presentations based on pool-time view to answer a variety of queries about current status of a backup store, such as backup store 107. Turning now to FIG. 6, lifecycle 601 may indicate similar data paths 601, 603 occurred at different points along time line 607. Each data path may correspond to one data lifecycle. Diagram 600 may indicate a need for one single policy to protect data sets of data paths 601, 603. Data paths 601, 603 may be associated with a similar schedule to copy/clone associated data sets (or save sets) to common target pools 3 and 6 as indicated along pool line 605. Time sequence of backup operations for data paths 601, 603 may be aligned or alignable (e.g. based on time shift) along time line 607.

Data path 601 may indicate data elements in the associate data set were backed up (e.g. from client machines) during time unit 1 to pool 3. Subsequently during time unit 2 (or immediately after being backed up), data elements of the data set were cloned from pool 3 to pool 6. Data set of data path 601 was retained for two time units in pool 3 and 6 units in pool 6. A data lifecycle may indicate that the associated data set was automatically purged from a target pool after expiration of a retaining period which may be specified in a policy of data lifecycle.

Turning now to FIG. 7, lifecycles 701 and 703 may indicate data paths of different (e.g. not similar) lifecycles. Lifecycle 701 may be associated with target pools, such as pool 1 and pool 4, which are not shared or common with lifecycle 703. Additionally, lifecycles 701 and 703 may be associated with two sequences of backup operations which may not be aligned along the time line.

FIGS. 8A-8F are sample diagrams illustrating exemplary visual representations of data lifecycles according to one embodiment of the invention, for example, based on manager system 217 of FIG. 2. Data path 801 of FIG. 8A and data path 803 of FIG. 8B may not be similar as retention periods (e.g. time period for life after clone) differ in at least one common target pool. Data path 805 of FIG. 8C and data path 807 of FIG. 8D may indicate a difference in target pools. Data path 807 may not be similar to data paths 801, 803 and 805 based on differences in targeted backup pools. Data path 807 and data path 809 of FIG. 8E may be similar sharing common or alignable backup schedules, retention periods and target pools. Data path 811 of FIG. 8F and data path 801 may not be similar because of a difference in source pool of a backup operation (e.g. cloning from pool 4 to pool 1 vs. cloning from pool 5 to pool 1), although both data paths share common target pools and backup schedules.

In some embodiments, multiple tests may be configured, for example via visual presentations, to expose whether two data paths or graphs are similar. These tests may correspond to determining whether similarity distance between two data paths is beyond a threshold value or whether these two data paths are not similar. In one embodiment, measurements of similarity among data paths may include comparisons via one or more of these tests (e.g. without a specific order among these tests). Each test may indicate whether a path is not similar to a particular data path.

For example, a first test for similarity may include determining whether two data paths (or graphs) share common target pools. Two data paths may not be similar if they do not share common target pools. Data paths sharing common target pools may be visually presented in Pool-Time view as lying along common horizontal lines (which can indicate target pools). The first test may indicate that data paths 801, 803 and 811 share a common set of target pools [1, 4, 5] and data paths 807, 809 share a common set of target pools [3, 6]. Data paths 803, 811 may pass the first test for data path 801 for similarity identification.

In one embodiment, a second test can determine whether two data paths include common backup operations. Two data paths may not be similar if they do not include common backup operations. Data paths having common backup operations may be visually presented via common (or substantially similar within a time margin) vertical lines in chronological order in Pool-Time view. A vertical line may be represented as <source identifier, target identifier> corresponding to backup operation from a source to a target pool at a point in time. The source may be a client machine (e.g. identified by −1) or a source pool. The second test may be performed among data paths that have passed the first test.

For example, the second test may indicate data paths 801, 803 include common backup operations represented as <−1, 5>, <5, 4>, <4, 1>; data paths 807, 809 include common backup operations represented as <−1, 3>, <3, 6>; and data path 811 with backup operations <−1, 5>, <5, 4>, <5, 1> which differ from backup operations of data paths 801, 803.

In one embodiment, a third test can determine whether two data paths share common retention periods in target pools. Two data paths may not be similar if they do not share common retention periods in target pools. Data paths having common retention periods in target pools may be visually presented via horizontal line segments of similar lengths (e.g. differing within a margin) for common target pools in Pool-Time view. The third test may be performed among data paths that have passed the second test. For example the third test can indicate data paths 807, 809 share common retention periods in target pools and data paths 801 and 803 do not share common retention periods.

In one embodiment, a fourth test can determine whether two data paths share common (e.g. alignable) backup schedules, e.g. with substantially similar time intervals (e.g. within a configurable time margin or a time granularity, such as 5 minutes) between adjacent backup operations. Two data paths may not be similar if they do not share common backup schedules. Data paths sharing common backup schedules may be visually presented via substantially common horizontal distances between vertical lines representing backup operations in Pool-Time view. The fourth test may be performed among data paths that have passed the third test. For example the fourth test can indicate data paths 807, 809 share common share common backup schedules.

In one embodiment, visual presentations of data paths or lifecycles may provide answers, e.g. graphically, to queries or questions, such as storage pools in which a client data is currently backed up or cloned, retention periods associated with each copy of the client data currently stored, the number of data lifecycles encapsulated (or included) in a particular policy encapsulate, percentage or portion of stored data belonging to a data lifecycle, policies supporting data lifecycles similar to a data lifecycle of a particular client, data IO operations (e.g. read/write) vs. time graph for each storage pool with minimum, average and maximum accessing time indicated, listing of data set with multiple datapaths along with the graphical presentation of the data paths (e.g. a data set getting split into three different target pools in a backup operation) etc.

Figure 9:
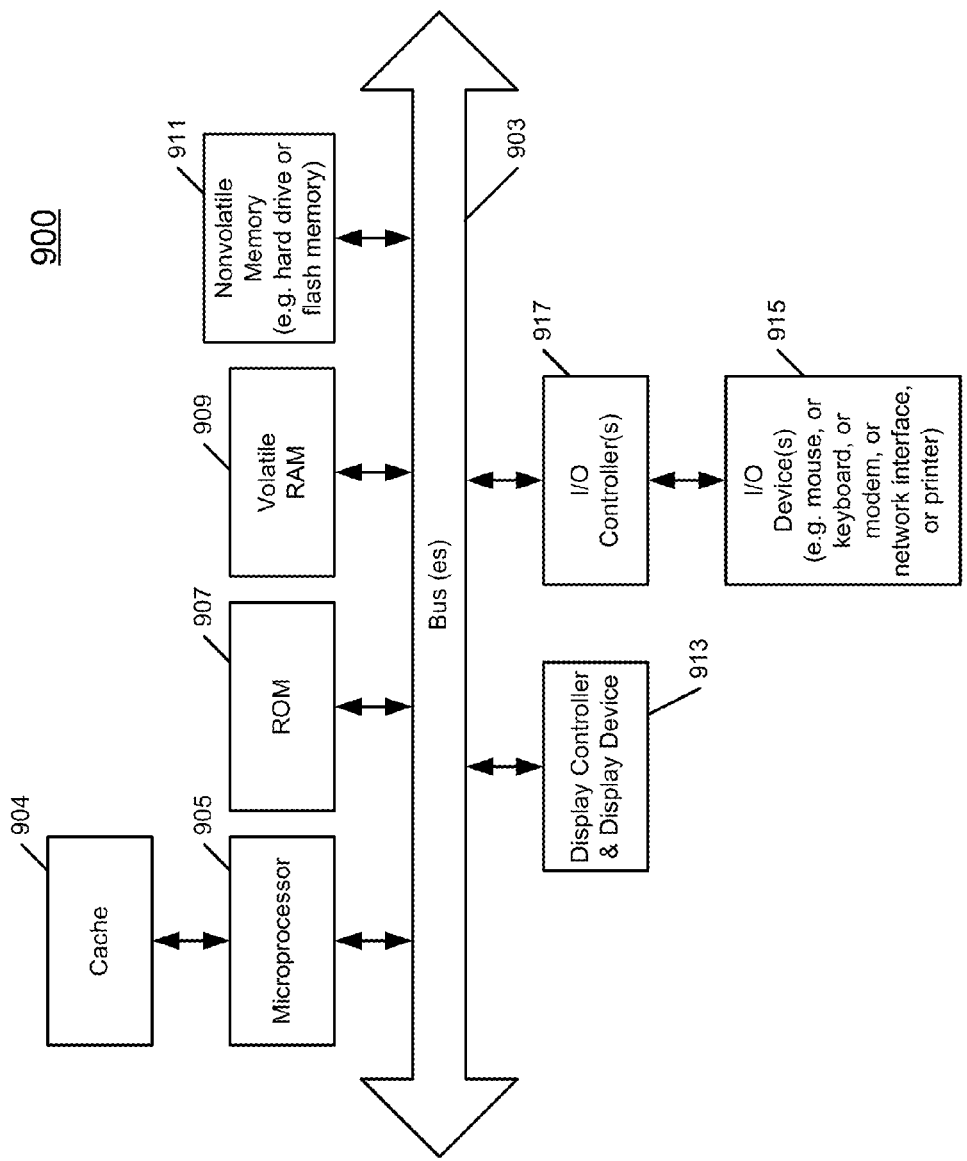
FIG. 9 illustrates one example of a typical computer system which may be used in conjunction with the embodiments described herein.

FIG. 9 shows one example of a computer system which may be used with one embodiment the present invention. For example, the system 900 may be implemented as a part of the systems shown in FIG. 1. Note that while FIG. 9 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 9, the computer system 901, which is a form of a data processing system, includes a bus 903 which is coupled to a microprocessor(s) 905 and a ROM (Read Only Memory) 907 and volatile RAM 909 and a non-volatile memory 911. The microprocessor 903 may retrieve the instructions from the memories 907, 909, 911 and execute the instructions to perform operations described above. The bus 903 interconnects these various components together and also interconnects these components 905, 907, 909, and 911 to a display controller and display device 913 and to peripheral devices such as input/output (I/O) devices which may be mice, keyboards, modems, network interfaces, printers and other devices which are well known in the art. Typically, the input/output devices 915 are coupled to the system through input/output controllers 917. The volatile RAM (Random Access Memory) 909 is typically implemented as dynamic RAM (DRAM) which requires power continually in order to refresh or maintain the data in the memory.

The mass storage 911 is typically a magnetic hard drive or a magnetic optical drive or an optical drive or a DVD RAM or a flash memory or other types of memory systems which maintain data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method comprising:
providing a history of data lifecycles for a plurality of data sets protected via a backup store having one or more storage devices, wherein each data lifecycle represents a data path across one or more of the storage devices in time during which a data set has been copied or moved according to one of a first set of policies for backup maintained by the backup store, the data path including information recording the one or more storage devices and time the data set was copied or moved at each of the one or more storage devices;
determining, by a similarity analysis module, similarity measures among the data lifecycles, wherein the similarity measures indicate whether data path of the data lifecycles accessing the data sets are similar, including determining whether any of data paths of the lifecycles leads to a common target storage device;
consolidating, by a policy updating module, the first set of policies into a second set of policies based on the similarity measures of the data lifecycles, wherein a number of the second set of policies is smaller than a number of the first set of policies, wherein at least two or more of the first set of policies are combined into one single policy, wherein the two or more of the first set of policies are similar according to the similarity measures; and
in response to a client request to protect a particular data set, configuring the storage devices to back up the particular data set according to one of the second set of policies that is associated with the particular data set.

2. The method of claim 1, wherein the storage devices are partitioned into one or more pools, wherein a data lifecycle of each data set specifies one or more backup operations that has been performed according to a schedule indicated in the data lifecycle to copy respective data set of the data lifecycle to a destination one of the pools, and wherein backup operations of two similar data lifecycles backed up data to at least one common destination pool.

3. The method of claim 2, wherein the backup operations are characterized by attributes having values, wherein each data lifecycle is represented via a collection of attribute values, and wherein the determining of the similarity measures comprises:
identifying a difference between two collections of attribute values of two separate data lifecycles, wherein the two separate data lifecycles are similar if the difference is within a threshold value.

4. The method of claim 3, further comprising:
presenting a graphical view of at least one data lifecycle via a user interface, wherein the graphical view indicates backup operations according to the schedule of the at least one data lifecycle.

5. The method of claim 4, wherein the graphical view is updated in real time and wherein the updated graphical view indicates where in the pools the data set of the data lifecycle is currently stored.

6. The method of claim 3, wherein each pool is identified by an identifier, and wherein the attributes include a destination identifier for the destination pool of the backup operation.

7. The method of claim 6, wherein at least one of backup operations specified in a data set associated with a particular data lifecycle copies the data set associated with the particular data lifecycle from a source one of the pools to a particular destination pool to clone the data set associated with the particular data lifecycle, the source pool identified by a source identifier, the particular destination pool identified by a particular destination identifier and wherein the attributes include an ordered pool pair of the source identifier and the particular destination identifier to represent the at least one backup operation.

8. The method of claim 7, wherein the two collections of attribute values include a first collection and a second collection separately representing a first one and a second one of the two separate data lifecycles, wherein the first collection includes a first ordered pool pair for a certain backup operation, wherein the difference between the two separate data lifecycles is greater than the threshold value if the second collection does not include the first ordered pool pair.

9. The method of claim 8, wherein the attributes include a schedule for each backup operation, wherein the attributes include a temporal sequence associated with scheduled times of the backup operations of the schedule, wherein the first collection includes a first temporal sequence for a first backup operations of the first one of the two separate data lifecycles, wherein the second collection includes a second temporal sequence for a second backup operation of the second one of the two separate data lifecycles, wherein the difference between the two separate data lifecycles is greater than the threshold value if the first temporal sequence and the second temporal sequence are not temporally alignable within a threshold time granularity, wherein the first temporal sequence includes a first number of time durations of the first temporal sequence, wherein the second temporal sequence includes a second number of time durations of the second temporal sequence, and wherein the first temporal sequence and the second temporal sequence are alignable if the first number and the second number are of a common number and each pair of corresponding time durations differ within a threshold value.

10. A non-transient machine readable storage medium having instructions therein, which when executed by a machine, cause the machine to perform operations, the operations comprising:
providing a history of data lifecycles for a plurality of data sets protected via a backup store having one or more storage devices, wherein each data lifecycle represents a data path across one or more of the storage devices in time during which a data set has been copied or moved according to one of a first set of policies for backup maintained by the backup store, the data path including information recording the one or more storage devices and time the data set was copied or moved at each of the one or more storage devices;
determining similarity measures among the data lifecycles, wherein the similarity measures indicate whether data paths of the data lifecycles accessing the data sets are similar, including determining whether any of data paths of the lifecycles leads to a common target storage device;
consolidating the first set of policies into a second set of policies based on the similarity measures, wherein a number of the second set of policies is smaller than a number of the first set of policies, wherein at least two or more of the policies are combined into one single policy, wherein the two or more of the first set of policies are similar according to the similarity measures; and
in response to a client request to protect a particular data set, configuring the storage devices to back up the particular data set according to one of the second set of policies that is associated with the particular data set.

11. The medium of claim 10, wherein the storage devices are partitioned into one or more pools, wherein a data lifecycle of each data set specifies one or more backup operations that has been performed according to a schedule indicated in the data lifecycle to copy respective data set of the data lifecycle to a destination one of the pools, and wherein backup operations of two similar data lifecycles backed up data to at least one common destination pool.

12. The medium of claim 11, wherein the backup operations are characterized by attributes having values, where each data lifecycle is represented via a collection of attribute values and wherein the determining of the similarity measures comprises:
identifying a difference between two collections of attribute values of two separate data lifecycles, wherein the two separate data lifecycles are similar if the difference is within a threshold value.

13. The medium of claim 12, wherein the attributes include a retention duration for each destination pool identified in each backup operation, wherein the data set of the data lifecycle is retained in the destination pool identified for the retention duration after being copied to the destination pool, wherein a similarity measure of the two data lifecycles depends on whether two retention durations for a commonly identified destination pool specified in the two data lifecycles differ within a threshold time margin.

14. The medium of claim 11, wherein the history of data lifecycles includes a selected recent portion of data lifecycles stored for the backup store and current data lifecycles.

15. The medium of claim 11, wherein the backup requirements specify a backup schedule to one of the destination pool and wherein the one consolidated policy includes one backup operation to the destination pool according to the backup schedule.

16. The medium of claim 15, wherein the additional policy is generated via a modification of the one consolidated policy according to the backup requirements.

17. A computer system comprising:
a memory storing executable instructions;
a network interface coupled to one or more storage devices;
a processor coupled to the memory and the network interface to execute the instructions from the memory, the processor being configured to provide a history of data lifecycles for a plurality of data sets protected via a backup store having one or more storage devices, wherein each data lifecycle represents a data path across one or more of the storage devices in time during which a data set has been copied or moved according to one of a first set of policies for backup maintained by the backup store, the data path including information recording the one or more storage devices and time the data set was copied or moved at each of the one or more storage devices;
determine similarity measures among the data lifecycles, wherein the similarity measures indicate whether data paths of the data lifecycles accessing the data sets are similar, including determining whether any of data paths of the lifecycle leads to a common target storage device;

consolidate the first set of policies into a second set of policies based on the similarity measures, wherein a number of the second set of policies is smaller than a number of the first set of policies, wherein at least two or more of the policies are combined into one single policy, wherein the two or more of the first set of policies are similar according to the similarity measures, and in response to a client request to protect a particular data set, configure the storage devices to back up the particular data set according to one of the second set of policies that is associated with the particular data set.

18. The system of claim 17, wherein the storage devices are partitioned into one or more pools, wherein a data lifecycle of each data set specifies one or more backup operations that has been performed according to a schedule indicated in the data lifecycle to copy respective data set of the data lifecycle to a destination one of the pools, and wherein backup operations of two similar data lifecycles backed up data to at least one common destination pool.

19. The system of claim 18, wherein the backup operations are characterized by attributes having values, wherein each data lifecycle is represented via a collection of attribute values and wherein the determining of the similarity measures comprises:

identifying a difference between two collections of attribute values of two separate data lifecycles, where in the two separate data lifecycles are similar if the difference is within a threshold value.

20. The system of claim 19, the processor further configured to:

present a graphical view of at least one data lifecycle via a user interface, wherein the graphical view indicating backup operations according to a schedule of the at least one data lifecycle.

21. The system of claim 20, wherein the data set was copied to a particular one of the pools and wherein the graphical view indicates which period of time the data set was stored in the particular pool.

* * * * *